(12) United States Patent
Lee et al.

(10) Patent No.: US 11,374,230 B2
(45) Date of Patent: Jun. 28, 2022

(54) METHOD FOR PRODUCING FUEL CELL CATALYST, AND FUEL CELL CATALYST PRODUCED THEREBY

(71) Applicant: LG CHEM, LTD., Seoul (KR)

(72) Inventors: Wonkyun Lee, Daejeon (KR); Sang Hoon Kim, Daejeon (KR); Gyo Hyun Hwang, Daejeon (KR); Jun Yeon Cho, Daejeon (KR); Kwanghyun Kim, Daejeon (KR); Ran Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 53 days.

(21) Appl. No.: 16/620,717

(22) PCT Filed: Sep. 6, 2018

(86) PCT No.: PCT/KR2018/010409
§ 371 (c)(1),
(2) Date: Dec. 9, 2019

(87) PCT Pub. No.: WO2019/059570
PCT Pub. Date: Mar. 28, 2019

(65) Prior Publication Data
US 2020/0144630 A1 May 7, 2020

(30) Foreign Application Priority Data
Sep. 19, 2017 (KR) .......................... 10-2017-0120359

(51) Int. Cl.
*H01M 4/92* (2006.01)
*H01M 8/1004* (2016.01)

(52) U.S. Cl.
CPC ......... *H01M 4/925* (2013.01); *H01M 8/1004* (2013.01)

(58) Field of Classification Search
None
See application file for complete search history.

(56) References Cited

U.S. PATENT DOCUMENTS

| 6,344,291 | B1 | 2/2002 | Hitomi |
| 2009/0023032 | A1 | 1/2009 | Obata |
| 2010/0048388 | A1 | 2/2010 | Konish |
| 2014/0050995 | A1* | 2/2014 | Dai ..................... H01M 4/8652 429/405 |
| 2018/0375108 | A1* | 12/2018 | Cho ................... H01M 4/9041 |

FOREIGN PATENT DOCUMENTS

| JP | 2000-12041 A | 1/2000 |
| JP | 2009-26546 A | 2/2009 |
| JP | 6159621 B2 | 7/2017 |

(Continued)

OTHER PUBLICATIONS

International Search Report (PCT/ISA/2010) issued in PCT/KR2018/010409, dated Dec. 11, 2018.

*Primary Examiner* — Daniel S Gatewood
(74) *Attorney, Agent, or Firm* — Birch, Stewart, Kolasch & Birch, LLP

(57) ABSTRACT

A method for preparing a catalyst for a fuel cell including performing a first supporting; separating particles unsupported in the first supporting; heat treating; and performing a second supporting, and a catalyst for a fuel cell prepared using the same.

13 Claims, 9 Drawing Sheets

(56) References Cited

FOREIGN PATENT DOCUMENTS

| KR | 10-2005-0031017 A | | 4/2005 | | |
|---|---|---|---|---|---|
| KR | 10-2005-0098818 A | | 10/2005 | | |
| KR | 10-2007-0109439 A | | 11/2007 | | |
| KR | 20070109439 A | * | 11/2007 | | |
| KR | 10-2009-0123915 A | | 12/2009 | | |
| KR | 10-2010-0138423 A | | 12/2010 | | |
| KR | 20100138423 A | * | 12/2010 | | |
| KR | 10-1484364 B1 | | 1/2015 | | |
| KR | 10-2016-0110649 A | | 9/2016 | | |
| KR | 10-2017-0092125 A | | 8/2017 | | |
| KR | 20170092125 A | * | 8/2017 | .......... | H01M 4/8657 |

\* cited by examiner

[FIG. 1]
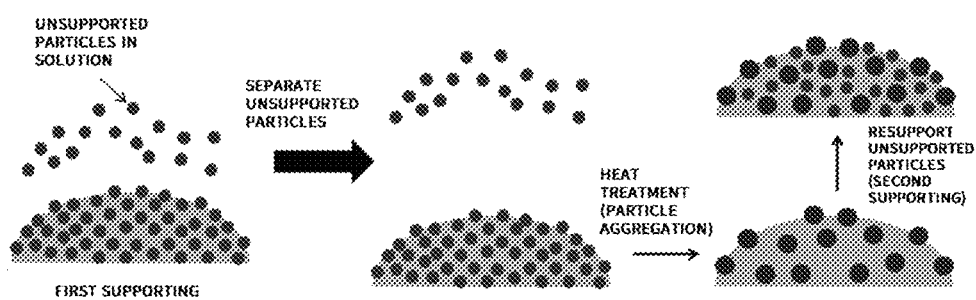
[FIG. 2]
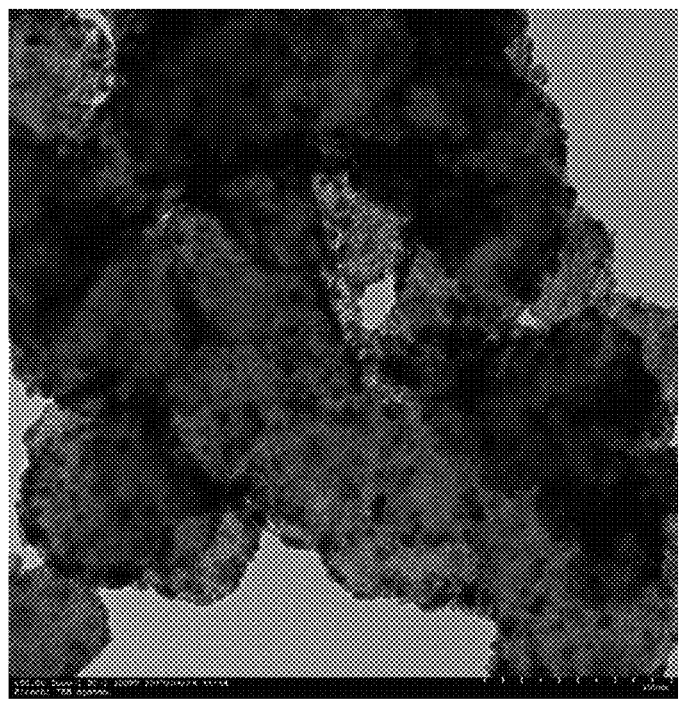

[FIG. 3]
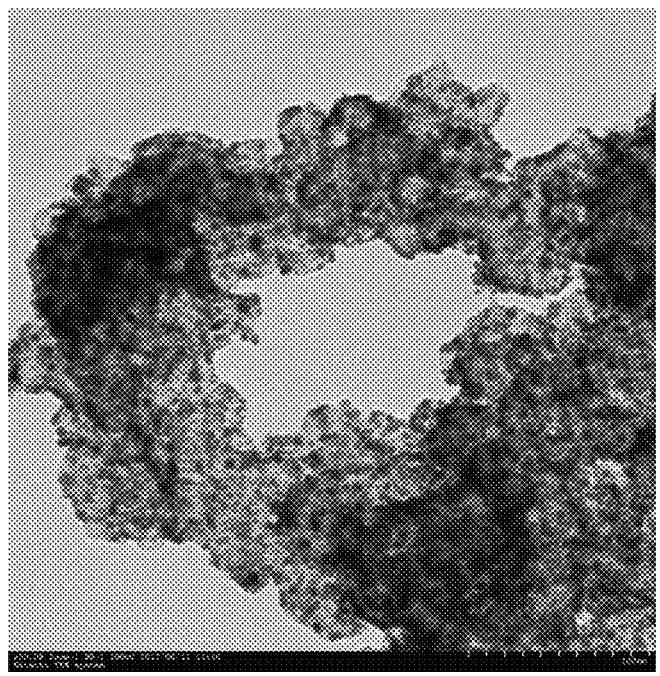

[FIG. 4]
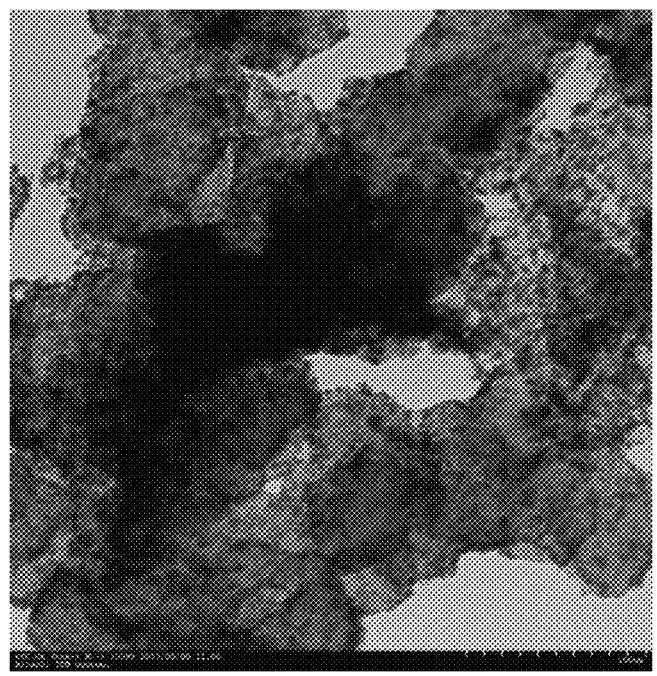

[FIG. 5]
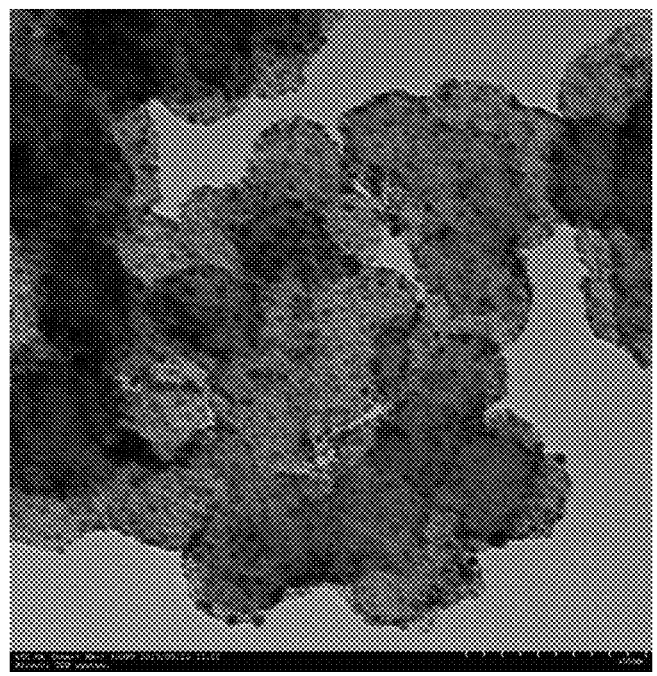

[FIG. 6]
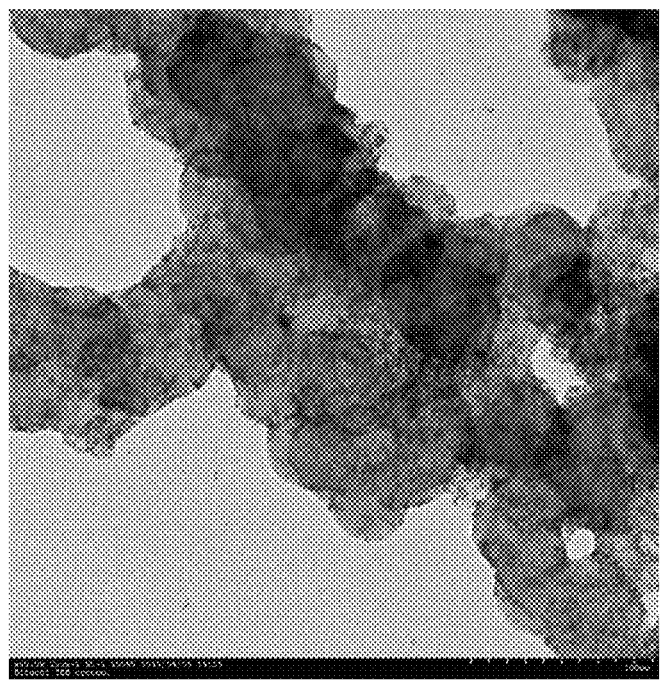

[FIG. 7]
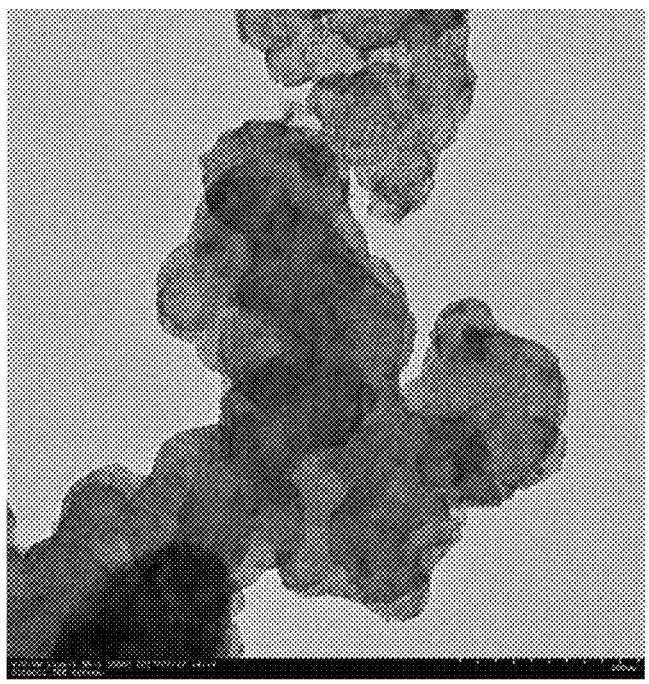

[FIG. 8]
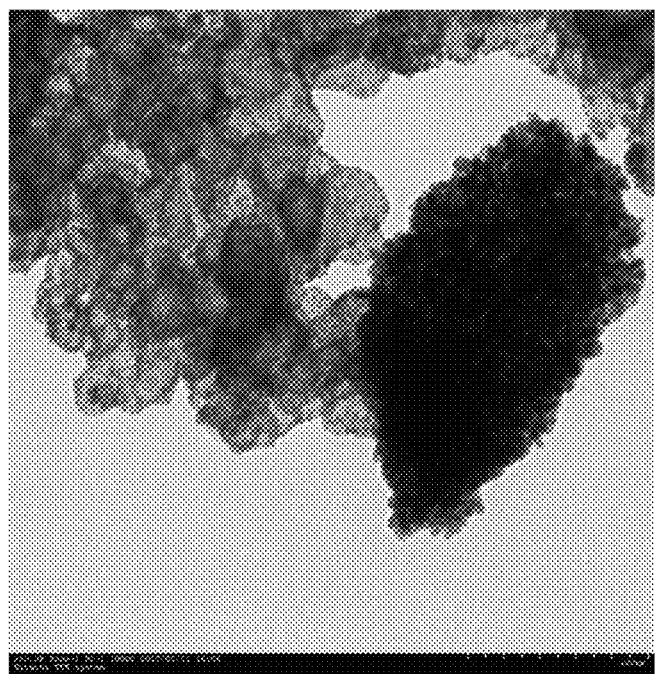

[FIG. 9]
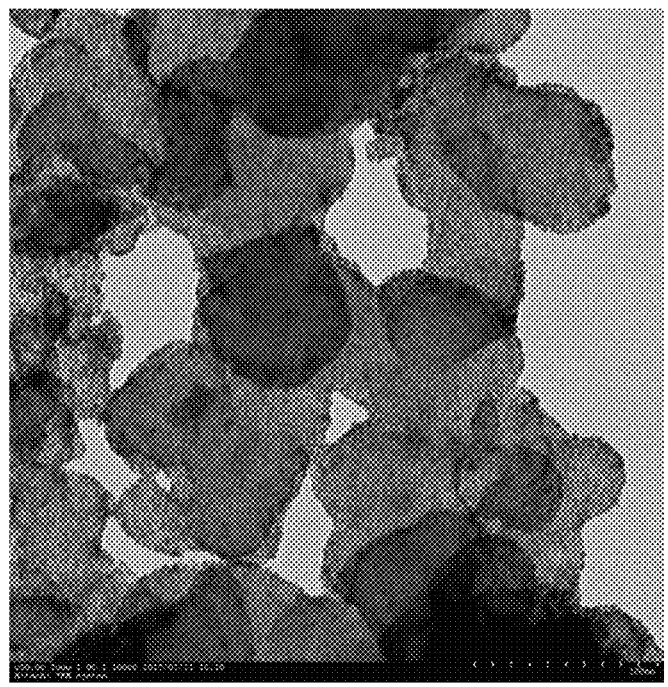

[FIG. 10]
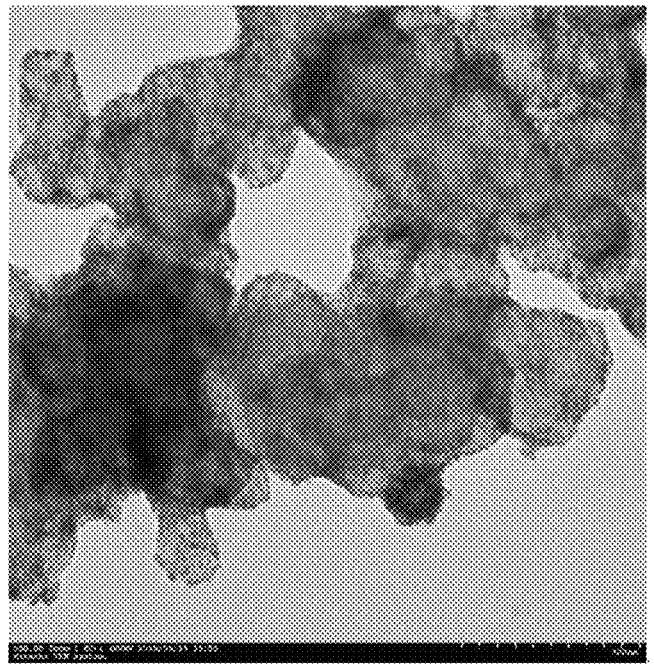
[FIG. 11]
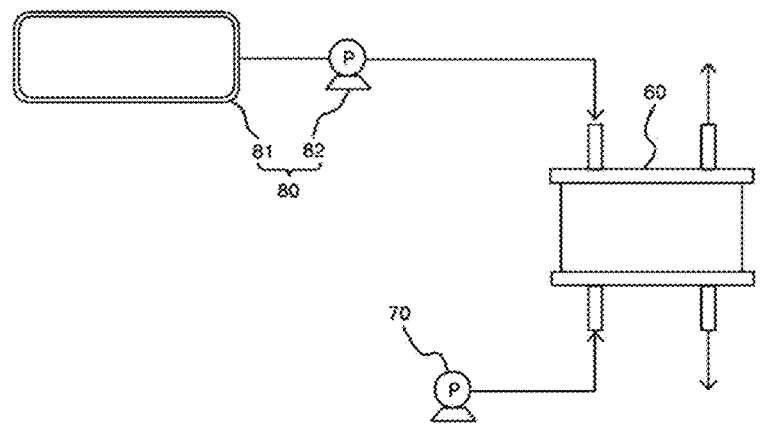
CONVENTIONAL ART

METHOD FOR PRODUCING FUEL CELL CATALYST, AND FUEL CELL CATALYST PRODUCED THEREBY

TECHNICAL FIELD

This application claims priority to and the benefits of Korean Patent Application No. 10-2017-0120359, filed with the Korean Intellectual Property Office on Sep. 19, 2017, the entire contents of which are incorporated herein by reference.

The present disclosure relates to a method for preparing a catalyst for a fuel cell and a catalyst for a fuel cell prepared using the same.

BACKGROUND ART

A fuel cell is, as a clean energy source capable of replacing fossil energy, a power generating system converting chemical energy of hydrogen and oxygen included in hydrocarbon-based materials such as methanol, ethanol and natural gas directly to electric energy by an electrochemical reaction.

Typical examples of a fuel cell may include a polymer electrolyte membrane fuel cell (PEMFC) or a direct methanol fuel cell (DMFC) using methanol as a fuel, and the like, and what influences performance in the PEMFC or the DMFC is a membrane-electrode assembly (MEA).

The MEA is formed with a solid polymer electrolyte membrane including a hydrogen ion conducting polymer and two electrodes separated thereby, and these two electrodes are referred to as an anode (called "oxidation electrode" or "fuel electrode") and a cathode (called "reduction electrode" or "air electrode").

The anode and the cathode include an electrode catalyst for activating a reaction, and the electrode catalyst is generally used while supporting metal nanoparticles on a support, and therefore, increasing a supporting ratio is an important challenge.

DISCLOSURE

Technical Problem

The present disclosure is directed to providing a method for preparing a catalyst for a fuel cell and a catalyst for a fuel cell prepared using the same.

Technical Solution

One embodiment of the present specification provides a method for preparing a catalyst for a fuel cell including forming a polymer layer on a support; first supporting of preparing a support-nanoparticle composite by supporting metal nanoparticles on the polymer layer-formed support; separating particles unsupported in the first supporting; heat treating the support-nanoparticle composite; and second supporting of supporting the separated unsupported particles on the heat-treated support-nanoparticle composite.

Another embodiment of the present specification provides a catalyst for a fuel cell prepared using the preparation method.

Another embodiment of the present specification provides a membrane-electrode assembly including an electrode catalyst layer including the catalyst for a fuel cell; and an electrolyte membrane.

Another embodiment of the present specification provides a fuel cell including the membrane-electrode assembly.

Advantageous Effects

According to a method for preparing a catalyst for a fuel cell of the present disclosure, a high supporting ratio can be maintained even with a support having a small specific surface area.

In addition, according to the method for preparing a catalyst for a fuel cell of the present disclosure, both a high supporting ratio and uniform supporting can be accomplished.

Furthermore, according to the method for preparing a catalyst for a fuel cell of the present disclosure, the amount of a metal precursor used can be reduced, and process costs and time can be saved.

DESCRIPTION OF DRAWINGS

FIG. 1 illustrates a process for preparing a catalyst for a fuel cell according to one embodiment of the present specification using a mimetic diagram.

FIG. 2 shows a transmission electron microscope (hereinafter, TEM) image of a catalyst prepared in Example 1.

FIG. 3 shows a TEM image of a catalyst prepared in Example 2.

FIG. 4 shows a TEM image of a catalyst prepared in Example 3.

FIG. 5 shows a TEM image of a catalyst prepared in Example 4.

FIG. 6 shows a TEM image of a catalyst prepared in Comparative Example 1.

FIG. 7 shows a TEM image of a catalyst prepared in Comparative Example 2.

FIG. 8 shows a TEM image of a catalyst prepared in Comparative Example 3.

FIG. 9 shows a TEM image of a catalyst prepared in Comparative Example 4.

FIG. 10 shows a TEM image of a catalyst prepared in Example 5.

FIG. 11 schematically illustrates a fuel cell used in the art.

REFERENCE NUMERAL

60: Stack
70: Oxidizer Supply Unit
80: Fuel Supply Unit
81: Fuel Tank
82: Pump

Mode for Disclosure

In the present specification, a description of a certain part "including" certain constituents means capable of further including other constituents, and does not exclude other constituents unless particularly stated on the contrary.

In the present specification, a description of a certain member being placed "on" another member includes not only a case of the one member adjoining the another member but a case of still another member being present between the two members.

Hereinafter, preferred embodiments of the present disclosure will be described. However, embodiments of the present disclosure may be modified to various other forms and the scope of the present disclosure is not limited to the embodiments to describe below. In addition, embodiments of the present disclosure are provided in order to more fully describe the present disclosure to those having average knowledge in the art.

One embodiment of the present specification provides a method for preparing a catalyst for a fuel cell including forming a polymer layer on a support; first supporting of preparing a support-nanoparticle composite by supporting metal nanoparticles on the polymer layer-formed support; separating particles unsupported in the first supporting; heat treating the support-nanoparticle composite; and second supporting of supporting the separated unsupported particles on the heat-treated support-nanoparticle composite.

Supporting particles on a support using a polyol process as in the art has a problem in that particle supporting is difficult when a $OH^-$ concentration in the solution is high due to electrostatic repulsion. In view of the above, a method of supporting forcibly by introducing acids is also used, however, this also has a problem in that particles are difficult to be uniformly supported when using a support with a low specific surface area due to aggregation between the particles.

Meanwhile, by using a two-step supporting method, the method for preparing a catalyst for a fuel cell according to the present disclosure is capable of reaching a target supporting ratio while maintaining a uniform supporting shape since the method induces aggregation between supported particles through heat treatment after the first supporting and is, without aggregation, capable of further supporting particles unsupported in the first supporting on a supporting site additionally secured by the aggregation. Specifically, an advantage of accomplishing 95% or greater supporting achievement rate (actual supporting ratio compared to target supporting ratio) may be obtained even with a support having a small specific surface area (for example, 100 $m^2/g$ or less).

According to one embodiment of the present specification, the amount of a metal precursor changes depending on the target supporting ratio, and the actual supporting ratio changes accordingly, and therefore, the supporting achievement rate may be maintained at a constant level.

Specifically, the amount of a metal precursor may be adjusted so that the 'target supporting ratio' and the 'metal weight with respect to a sum of support and metal weights' (metal weight/(support+metal weights)) are the same. The metal weight means a metal weight in the metal precursor rather than a weight of the metal precursor.

According to one embodiment of the present specification, the carbon support may be a carbon-based support, and as the carbon-based support, one or more types selected from the group consisting of carbon black, carbon nanotubes (CNT), graphite, grapheme, activated carbon, mesoporous carbon, carbon fiber and carbon nanowires may be used.

According to one embodiment of the present specification, the support may have a specific surface area (BET) of 100 $m^2/g$ or less, and specifically, 90 $m^2/g$ or less. This means that a support having a small specific surface area may also be used when using the preparation method of the present disclosure.

According to one embodiment of the present specification, the forming of a polymer layer on a support may be carried out by coating a polymer solution including a polymer including at least one or more of a pyridine group and an amine group on a support.

Specifically, the forming of a polymer layer on a support may be carried out by coating a polymer solution including poly(4-vinylpyridine) or poly(allylamine hydrochloride) on a support.

According to one embodiment of the present specification, the polymers may each have a weight average molecular weight of greater than or equal to 500 g/mol and less than or equal to 1,000,000 g/mol. Specifically, weight average molecular weights may each be greater than or equal to 1,000 g/mol and less than or equal to 100,000 g/mol.

According to one embodiment of the present specification, the polymer layer may be provided on a part or all of the support surface. The polymer layer may be provided on 50% to 100% of the area of the carbon support surface, and specifically, the polymer layer may be provided on 75% to 100% of the area.

According to one embodiment of the present specification, when forming the polymer layer on the support, stability and dispersibility may be secured since N present in the polymer layer functions as an anchoring site when supporting metal nanoparticles.

As a solvent when forming the polymer solution, one or more types selected from the group consisting of water; alcohols such as methanol, ethanol, propanol and isopropanol; and dimethylformamide may be used, and preferably, water may be used.

According to one embodiment of the present specification, the polymer solution may further include at least one acid among hydrochloric acid, nitric acid and sulfuric acid.

According to one embodiment of the present specification, the polymer solution may further include at least one acid among hydrochloric acid, nitric acid and sulfuric acid.

According to one embodiment of the present specification, when using water as the solvent in the polymer solution formation, the polymer solution may further include potassium nitrate ($KNO_3$).

It is preferred that the polymer content is from 0.05% by weight to 20% by weight, and specifically from 1% by weight to 10% by weight based on the total weight of the polymer solution.

The polymer content being in the above-mentioned range has an advantage of forming a uniform coating layer since the support surface is readily coated.

According to one embodiment of the present specification, the first supporting is carried out using a first composition including the polymer layer-formed support; a metal precursor; and a first solvent.

Specifically, a process of dispersing the polymer layer-formed support into the first solvent, and then mixing the metal precursor to the dispersion solution may be included.

According to one embodiment of the present specification, the content of the polymer layer-formed support may be greater than or equal to 0.1% by weight and less than or equal to 3% by weight based on the total weight of the first composition.

According to one embodiment of the present specification, the metal precursor is a material prior to being reduced to metal nanoparticles, and the metal precursor may be selected depending on the metal nanoparticle types.

According to one embodiment of the present specification, the metal precursor may be a precursor of two or more types of metals different from each other.

According to one embodiment of the present specification, the metal precursor may be a nitrate ($NO_3^-$), a halide, a hydroxide ($OH^-$) or a sulfate ($SO_4^-$) of a metal.

According to one embodiment of the present specification, the metal precursor may be a precursor of one or more types of metals selected from the group consisting of platinum (Pt), cobalt (Co), nickel (Ni), iron (Fe), lead (Pd), ruthenium (Ru), chromium (Cr) and copper (Cu), and may preferably be a platinum (Pt) precursor. Using a platinum precursor is preferred since platinum is more active compared to other metals when used as a catalyst of a fuel cell.

According to one embodiment of the present specification, the platinum precursor may be $PtCl_4$, $K_2PtCl_4$, $K_2PtCl_6$, $H_2PtCl_4$, $H_2PtCl_6$, $Pt(acac)_2$, $Pt(NH_3)_4(NO_3)_2$, $Pt(NH_3)_4Cl_2$, $Pt(CH_3NH_2)_4(NO_3)_2$, $Pt(CH_3NH_2)_4Cl_2$, $Pt(H_2O)_4(NO_3)_2$, or $Pt(H_2O)_4Cl_2$, and may preferably be $PtCl_4$.

In the present specification, acac means acetylacetonate.

According to one embodiment of the present specification, the content of the metal precursor may be from 0.1% by weight to 5% by weight based on the total weight of the first composition.

According to one embodiment of the present specification, the first solvent may include one or more types selected from the group consisting of water, ethylene glycol, diethylene glycol and propylene glycol.

According to one embodiment of the present specification, the first solvent may be ethylene glycol.

According to one embodiment of the present specification, the content of the first solvent may be from 93% by weight to 98% by weight based on the total weight of the first composition.

According to one embodiment of the present specification, the first composition may further include one or more types selected from the group consisting of sodium hydroxide (NaOH), barium hydroxide ($Ba(OH)_2$), potassium hydroxide (KOH), calcium hydroxide ($Ca(OH)_2$) and lithium hydroxide (LiOH), and this is for adjusting a pH of the first composition by adding a basic material.

According to one embodiment of the present specification, the first supporting may include adjusting a pH of the first composition to 8 to 12.

Adjusting a pH of the first composition to 8 to 12 has an advantage in that the particle size may be controlled to be small.

According to one embodiment of the present specification, the first composition may further include a reducing agent for reducing metal ions. However, when using a solvent capable of performing a role of a reducing agent such as ethylene glycol, a separate reducing agent may not be included.

According to one embodiment of the present specification, the reducing agent is not particularly limited as long as it has, while being a strong reducing agent with standard reduction potential of −0.23 V or less, reducing power capable of reducing dissolved metal ions and precipitating the metal ions as metal particles.

According to one embodiment of the present specification, the reducing agent may be at least any one selected from the group consisting of $NaBH_4$, $NH_2NH_2$, $LiAlH_4$ and $LiBEt_3H$.

According to one embodiment of the present specification, washing and drying the support-nanoparticle composite may be further included after the first supporting.

According to one embodiment of the present specification, the washing uses water and ethanol, and may be carried out through a stirring and ultrasonic washing process.

According to one embodiment of the present specification, the drying may be carried out for 24 hours or longer under a 70° C. to 100° C. temperature and vacuum condition.

The method for preparing a catalyst for a fuel cell according to one embodiment of the present specification may include separating particles unsupported in the first supporting. This may be carried out through a process of separating the unsupported particle-dispersed solution through centrifugation after finishing the first supporting.

Whereas the unsupported particles do not sink since they have electrostatic repulsion and are dispersed in a solution, the support-nanoparticle composite produced by the first supporting favorably sinks, and therefore, the unsupported particles may be separated by cooling the solution completed with the first supporting to room temperature and then centrifuging the solution.

The method for preparing a catalyst for a fuel cell according to one embodiment of the present specification reuses unsupported particles introduced at the beginning but not able to be supported in the second supporting rather than additionally introducing a metal precursor, and therefore, has an advantage of decreasing the metal precursor amount used.

In addition, the metal precursor does not have to go through a separate reducing process in the second supporting, which saves process costs and time.

Moreover, the method has an advantage in that changes in the properties of the separated unsupported particles caused by heat are prevented since heat treatment is carried out on the support-nanoparticle composite after the unsupported particles are separated.

The method for preparing a catalyst for a fuel cell according to one embodiment of the present specification may include heat treating the support-nanoparticle composite prepared in the first supporting.

According to one embodiment of the present specification, the heat treatment may be carried out at a temperature of 200° C. to 600° C., and may be carried out at a temperature of preferably 400° C. to 600° C., and more preferably 450° C. to 550° C.

When the heat treatment temperature is 200° C. or higher, particle migration and aggregation is smooth sufficiently providing a supporting site, and particularly, when the temperature is 400° C. or higher, aggregation may be minimized while obtaining a high supporting achievement rate. The temperature being 600° C. or lower has an advantage of preventing decline in the activity caused by excessive aggregation.

As illustrated in a mimetic diagram of FIG. 1, supported particles aggregate when applying heat to the support-nanoparticle composite prepared in the first supporting, and due to such aggregation, a site for supporting may be additionally secured on the support surface. Accordingly, the particles unsupported in the first supporting may be additionally supported through the second supporting on the additionally secured site, and a target supporting ratio may be more readily accomplished even when the support has a small specific surface area.

Moreover, heat treatment is performed between the first supporting and the second supporting, and therefore, there is an advantage in that the particles supported in the second supporting may be supported without particular changes in the properties (for example, increase in particle sizes and/or changes in particle surface properties).

The method for preparing a catalyst for a fuel cell according to one embodiment of the present specification may further include cooling the support-nanoparticle composite immediately after the heat treatment.

According to one embodiment of the present specification, the second supporting may be carried out using a second composition including the heat-treated support-nanoparticle composite; the separated unsupported particles; and a second solvent.

Specifically, a process of dispersing the heat-treated support-nanoparticle composite into the second solvent, and then mixing the solution including the separated unsupported particles to the dispersion solution may be included.

According to one embodiment of the present specification, the content of the heat-treated support-nanoparticle composite may be from 0.1% by weight to 20% by weight based on the total weight of the second composition.

According to one embodiment of the present specification, the content of the separated unsupported particles may be from 0.1% by weight to 20% by weight based on the total weight of the second composition.

According to one embodiment of the present specification, one or more types selected from the group consisting of water; alcohols such as methanol, ethanol, propanol and isopropanol; and dimethylformamide may be used as the second solvent, and preferably, water may be used.

According to one embodiment of the present specification, the second solvent may further include at least one acid among hydrochloric acid, nitric acid and sulfuric acid, and may preferably include nitric acid.

According to one embodiment of the present specification, the second solvent may be an aqueous nitric acid solution, and the aqueous nitric acid solution may have a concentration of 0.01 M to 1 M.

According to one embodiment of the present specification, the content of the second solvent may be from 60% by weight to 90% by weight based on the total weight of the second composition.

According to one embodiment of the present specification, the second supporting may be carried out without a process of synthesizing metal nanoparticles, that is, a process of reducing the metal precursor.

The method for preparing a catalyst for a fuel cell according to one embodiment of the present specification may further include separating second unsupported particles unsupported in the second supporting; heat treating the second support-nanoparticle composite prepared in the second supporting*; and third supporting of supporting the separated second unsupported particles on the second support-nanoparticle composite.

According to one embodiment of the present specification, the second unsupported particles mean particles not supported even after the second supporting, and the second support-nanoparticle composite means a state of the support-nanoparticle composite immediately after completing the second supporting. The supporting ratio may gradually increase by repeating separating and resupporting of the unsupported particles in the same manner as above.

When preparing a catalyst through the method for preparing a catalyst for a fuel cell according to one embodiment of the present specification, a supporting achievement rate, a value presenting the actual supporting ratio with respect to the target supporting ratio as a percentage, may be 90% or higher, and specifically 95% or higher.

One embodiment of the present specification provides a catalyst for a fuel cell prepared using the method for preparing a catalyst for a fuel cell.

According to one embodiment of the present specification, each constitution of the catalyst for a fuel cell are the same as the descriptions provided above.

One embodiment of the present specification provides a membrane-electrode assembly including an electrode catalyst layer including the catalyst for a fuel cell; and an electrolyte membrane.

Furthermore, one embodiment of the present specification provides a fuel cell including the membrane-electrode assembly.

The fuel cell may be formed using materials and methods known in the art except for including the catalyst described above. When referring to FIG. 11, the fuel cell is formed including a stack (60), a fuel supply unit (80) and an oxidizer supply unit (70).

The stack (60) includes one, two or more membrane-electrode assemblies (MEA), and when including two or more membrane-electrode assemblies, a separator provided therebetween is included. The separator performs a role of preventing the membrane-electrode assemblies from being electrically connected, and delivering a fuel and an oxidizer supplied from the outside to the membrane-electrode assemblies.

The fuel supply unit (80) performs a role of supplying a fuel to the stack, and may be formed with a fuel tank (81) storing a fuel and a pump (82) supplying the fuel stored in the fuel tank (81) to the stack (60). As the fuel, gas or liquid state hydrogen or hydrocarbon fuel may be used, and examples of the hydrocarbon fuel may include methanol, ethanol, propanol, butanol or natural gas.

The oxidizer supply unit (70) performs a role of supplying an oxidizer to the stack. As the oxidizer, oxygen is typically used, and oxygen or air may be injected with a pump (82) to be used.

Hereinafter, the present specification will be described in detail with reference to examples. However, examples according to the present specification may be modified to various other forms, and the scope of the present specification is not to be construed as being limited to the examples described below. Examples of the present specification are provided in order to more fully describe the present specification to those having average knowledge in the art.

Example 1

3 g of poly(4-vinyl pyridine) (Sigma-Aldrich, Inc., P4VP) and 60 mL of 1 M hydrochloric acid (HCl) were added to 1 L of water, and dissolved therein through sufficient stirring. After that, 6 g of $KNO_3$ was further dissolved therein, and 1.8 g of FX100 (high crystalline carbon of Cabot Corporation, BET=87 $m^2/g$) was dispersed thereinto. The solution was stirred for 24 hours at room temperature, then washed with distilled water, and dried to prepare a polymer layer-formed carbon support (P4VP/FX100). After dispersing 45.8 mg of the polymer layer-formed carbon support into 40 mL of ethylene glycol, 118.6 mg of $PtCl_4$ and 64 mg of NaOH were mixed to the dispersion solution, and then the result was dispersed using ultrasonic waves. After that, the result was refluxed for 3 hours at 160° C. to complete first supporting. Then, the unsupported particle-dispersed solution was separated through centrifugation, and after washing the precipitated support-nanoparticle composites with ethanol and water, the composites were dried for 24 hours at 70° C. On the composite completed with the drying, heat treatment was progressed under Ar atmosphere using a method of heat treating by raising the temperature to 500° C. at a rate of 10° C./minute and then cooling to room temperature immediately after the heat treatment. After dispersing the composite completed with the heat treatment into 20 mL of 0.5 M nitric acid, second supporting was progressed by mixing the solution including the unsupported particles separated in advance to the dispersed dispersion solution. A catalyst prepared as a result was collected through filtration, and a TEM image of the prepared catalyst is shown in FIG. 2.

Example 2

After dispersing 43 mg of a polymer layer-formed carbon support (P4VP/FX100) prepared in the same manner as in Example 1 into 25 mL of ethylene glycol, 74.1 mg of $PtCl_4$ and 40 mg of NaOH were mixed to the dispersion solution, and then the result was dispersed using ultrasonic waves. After that, the result was refluxed for 3 hours at 160° C. to complete first supporting. Then, the unsupported particle-dispersed solution was separated through centrifugation, and after washing the precipitated support-nanoparticle composites with ethanol and water, the composites were dried for 24 hours at 70° C. On the composite completed with the drying, heat treatment was progressed under Ar atmosphere using a method of heat treating by raising the temperature to 500° C. at a rate of 10° C./minute and then cooling to room temperature immediately after the heat treatment. After dispersing the composite completed with the heat treatment into 20 mL of 0.5 M nitric acid, second supporting was progressed by mixing the solution including the unsupported particles separated in advance to the dispersed dispersion solution. A catalyst prepared as a result was collected through filtration, and a TEM image of the prepared catalyst is shown in FIG. 3.

Example 3

After dispersing 559 mg of a polymer layer-formed carbon support (P4VP/FX100) prepared in the same manner as in Example 1 into 200 mL of ethylene glycol, 963.3 mg of $PtCl_4$ and 520 mg of NaOH were mixed to the dispersion solution, and then the result was dispersed using ultrasonic waves. After that, the result was refluxed for 3 hours at 160° C. to complete first supporting. Then, the unsupported particle-dispersed solution was separated through centrifugation, and after washing the precipitated support-nanoparticle composites with ethanol and water, the composites were dried for 24 hours at 70° C. On the composite completed with the drying, heat treatment was progressed under Ar atmosphere using a method of heat treating by raising the temperature to 500° C. at a rate of 10° C./minute and then cooling to room temperature immediately after the heat treatment. After dispersing the composite completed with the heat treatment into 20 mL of 0.5 M nitric acid, second supporting was progressed by mixing the solution including the unsupported particles separated in advance to the dispersed dispersion solution. A catalyst prepared as a result was collected through filtration, and a TEM image of the prepared catalyst is shown in FIG. 4.

Example 4

6 g of poly(allylamine hydrochloride) (Sigma-Aldrich, Inc., PAH) was added to 1.5 L of water, and dissolved therein through sufficient stirring. After that, 6 g of $KNO_3$ was further dissolved therein, and 1.8 g of Ketjen black 300J (high specific surface area carbon of Lion Specialty Chemicals Co., Ltd., BET=647 $m^2/g$, KB300J) was dispersed thereinto. The solution was stirred for 24 hours at room temperature, then washed with distilled water, and dried to prepare a polymer layer-formed carbon support (PAH/KB300J). After dispersing 45.8 mg of the polymer layer-formed carbon support into 40 mL of ethylene glycol, 118.6 mg of $PtCl_4$ and 64 mg of NaOH were mixed to the dispersion solution, and then the result was dispersed using ultrasonic waves. After that, the result was refluxed for 3 hours at 160° C. to complete first supporting. Then, the unsupported particle-dispersed solution was separated through centrifugation, and after washing the precipitated support-nanoparticle composites with ethanol and water, the composites were dried for 24 hours at 70° C. On the composite completed with the drying, heat treatment was progressed under Ar atmosphere using a method of heat treating by raising the temperature to 500° C. at a rate of 10° C./minute and then cooling to room temperature immediately after the heat treatment. After dispersing the composite completed with the heat treatment into 20 mL of 0.5 M nitric acid, second supporting was progressed by mixing the solution including the unsupported particles separated in advance to the dispersed dispersion solution. A catalyst prepared as a result was collected through filtration, and a TEM image of the prepared catalyst is shown in FIG. 5.

Example 5

A catalyst was prepared in the same manner as in Example 4 except that the heat treatment was progressed at 300° C. instead of 500° C., and a TEM image of the prepared catalyst is shown in FIG. 10.

Comparative Example 1

After dispersing 559 mg of FX100 (high crystalline carbon of Cabot Corporation, BET=87 $m^2/g$), a carbon support, into 200 mL of ethylene glycol, 963.3 mg of $PtCl_4$ and 520 mg of NaOH were mixed to the dispersion solution, and then the result was dispersed using ultrasonic waves. After that, the result was refluxed for 3 hours at 160° C. to complete supporting. A catalyst prepared as a result was collected through filtration, and a TEM image of the prepared catalyst is shown in FIG. 6.

Comparative Example 2

After dispersing 559 mg of a polymer layer-formed carbon support (P4VP/FX100) prepared in the same manner as in Example 1 into 200 mL of ethylene glycol, 963.3 mg of $PtCl_4$ and 520 mg of NaOH were mixed to the dispersion solution, and then the result was dispersed using ultrasonic waves. After that, the result was refluxed for 3 hours at 160° C. to complete supporting. A catalyst prepared as a result was collected through filtration, and a TEM image of the prepared catalyst is shown in FIG. 7.

Comparative Example 3

After dispersing 559 mg of a polymer layer-formed carbon support (P4VP/FX100) prepared in the same manner as in Example 1 into 200 mL of ethylene glycol, 963.3 mg of $PtCl_4$ and 520 mg of NaOH were mixed to the dispersion solution, and then the result was dispersed using ultrasonic waves. After that, the result was refluxed for 3 hours at 160° C., and 1 M $H_2SO_4$ was added thereto to adjust the pH to 1. Then, the result was stirred for 1 hour after raising the temperature to 85° C., and stirred again for 12 hours or longer after lowering the temperature to room temperature to complete supporting. A catalyst prepared as a result was collected through filtration, and a TEM image of the prepared catalyst is shown in FIG. 8.

Comparative Example 4

After dispersing 43 mg of a polymer layer-formed carbon support (PAH/KB300J) prepared in the same manner as in Example 4 into 25 mL of ethylene glycol, 74.1 mg of $PtCl_4$ and 40 mg of NaOH were mixed to the dispersion solution, and then the result was dispersed using ultrasonic waves. After that, the result was refluxed for 3 hours at 160° C. to complete supporting. A catalyst prepared as a result was collected through filtration, and a TEM image of the prepared catalyst is shown in FIG. 9.

The following Table 1 describes target supporting ratios and actually achieved supporting ratios of Examples 1 to 4 and Comparative Examples 1 to 4. The supporting achievement rate is calculated by (actual supporting ratio/target supporting ratio)×100.

TABLE 1

|  | Target Supporting Ratio (wt %) | Actual Supporting Ratio (wt %) | Supporting Achievement Rate (%) |
| --- | --- | --- | --- |
| Example 1 | 60 | 60.4 | 100.7% |
| Example 2 | 50 | 47.5 | 95.0% |
| Example 3 | 50 | 50.6 | 101.2% |
| Example 4 | 60 | 59.7 | 99.5% |
| Example 5 | 60 | 48.8 | 81.3% |
| Comparative Example 1 | 50 | 26.6 | 53.2% |
| Comparative Example 2 | 50 | 33 | 66.0% |
| Comparative Example 3 | 50 | 49.8 | 99.6% |
| Comparative Example 4 | 50 | 42.1 | 84.2% |

It was identified that Examples 1 to 5 performing two-step supporting resupporting unsupported particles according to the preparation method of the invention of the present application approached the target supporting ratio, however, Comparative Examples 1, 2 and 4 performing one-step supporting only without the process of resupporting the unsupported particles were not able to accomplish the target supporting ratio.

Specifically, when comparing the results of Example 3 and Comparative Example 2 setting the same target supporting ratio, the content of the polymer layer-formed carbon support (poly(4-vinylpyridine)/FX100), the content of the ethylene glycol, the content of the $PtCl_4$ and the content of the NaOH were employed to be identical, however, the actual supporting ratio was higher in Example 3 than in Comparative Example 2 by 17.6 wt %. Comparative Example 4 using a carbon support with a large specific surface area (BET) accomplished a higher supporting ratio compared to Comparative Examples 1 and 2 due to an increased supporting site, but was not able to reach the supporting achievement rates of Examples 1 to 4 performing two-step supporting.

In addition, Comparative Example 3 performing additional supporting by reducing repulsion between unsupported particles dispersed into the solution through adding an acidic solution after the first supporting accomplished a high supporting ratio, however, aggregation between particles became serious and uniform supporting was not accomplished as identified in FIG. 8. This is due to the fact that the unsupported particles were further supported while being aggregated due to the acidic solution, and the supporting site obtained through the heat treatment after the first supporting was not able to be secured.

Meanwhile, when comparing the results of Examples 1 and 5, it was identified that Example 1 having a heat treatment temperature of 400° C. or higher had a significantly higher supporting achievement rate compared to Example 5 having a heat treatment temperature of lower than 400° C. In addition, as identified in FIG. 10, it was identified that, in Example 5 having a low heat treatment temperature, aggregation of particles not seen in FIG. 2 (Example 1) was observed in various places.

In other words, one embodiment of the present specification provides a method for preparing a catalyst for a fuel cell capable of obtaining even supporting while accomplishing a high supporting ratio.

The invention claimed is:

1. A method for preparing a catalyst for a fuel cell comprising steps of:
   (a) forming a polymer layer on a support,
      wherein the forming of the polymer layer is carried out by coating a polymer solution including a polymer on the support, the polymer comprising one or more selected from the group consisting of poly(4-vinylpyridine) or poly(allylamine hydrochloride);
   (b) preparing a support-nanoparticle composite by supporting metal nanoparticles on the polymer layer-formed support;
   (c) separating unsupported particles from the result of the support-nanoparticle composite;
   (d) heat treating the support-nanoparticle composite from which the unsupported particles have been separated, wherein the heat treating is carried out at a temperature of 400° C. to 600° C.; and
   (e) supporting the separated unsupported particles on the heat-treated support-nanoparticle composite.

2. The method for preparing a catalyst for a fuel cell of claim 1, wherein step (b) is carried out using a first composition including the polymer layer-formed support; a metal precursor; and a first solvent.

3. The method for preparing a catalyst for a fuel cell of claim 2, wherein the metal precursor is a platinum (Pt) precursor.

4. The method for preparing a catalyst for a fuel cell of claim 2, wherein the first solvent comprises one or more solvent selected from the group consisting of water, ethylene glycol, diethylene glycol and propylene glycol.

5. The method for preparing a catalyst for a fuel cell of claim 2, wherein step (b) includes adjusting a pH of the first composition to 8 to 12.

6. The method for preparing a catalyst for a fuel cell of claim 2, wherein the first composition further comprises one or more selected from the group consisting of sodium hydroxide (NaOH), barium hydroxide ($Ba(OH)_2$), potassium hydroxide (KOH), calcium hydroxide ($Ca(OH)_2$) and lithium hydroxide (LiOH).

7. The method for preparing a catalyst for a fuel cell of claim 1, further comprising, washing and drying the support-nanoparticle composite after step (b) and before step (c).

8. The method for preparing a catalyst for a fuel cell of claim 1, further comprising cooling immediately after heat treating the support-nanoparticle composite in step (d) and before step (e).

9. The method for preparing a catalyst for a fuel cell of claim 1, wherein step (e) is carried out using a second composition including the heat-treated support-nanoparticle composite; the separated unsupported particles; and a second solvent.

10. The method for preparing a catalyst for a fuel cell of claim 9, wherein the second solvent is water, and the second composition further includes nitric acid.

11. A catalyst for a fuel cell prepared using the preparation method of claim 1.

12. A membrane-electrode assembly comprising:
an electrode catalyst layer including the catalyst for a fuel cell of claim 11; and
an electrolyte membrane.

13. A fuel cell comprising the membrane-electrode assembly of claim 12.

* * * * *